United States Patent
Müller et al.

(10) Patent No.: US 10,487,925 B2
(45) Date of Patent: Nov. 26, 2019

(54) ADJUSTMENT ARRANGEMENT AND VALVE CONTROL DEVICE COMPRISING AN ADJUSTMENT ARRANGEMENT

(71) Applicant: Stabilus GmbH, Koblenz (DE)

(72) Inventors: Thomas Müller, Leuterod (DE); Jörg Hillen, Nörtershausen (DE); Thordes Lüttchens, Koblenz (DE); Mathias Wieland, Koblenz (DE); Thomas Schuth, Brey (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 15/441,301

(22) Filed: Feb. 24, 2017

(65) Prior Publication Data
US 2017/0248210 A1    Aug. 31, 2017

(30) Foreign Application Priority Data
Feb. 29, 2016   (DE) .................. 10 2016 203 265

(51) Int. Cl.
*F16H 25/04*   (2006.01)
*F16H 25/20*   (2006.01)
(Continued)

(52) U.S. Cl.
CPC ....... *F16H 25/2056* (2013.01); *E05F 15/622* (2015.01); *F16H 25/04* (2013.01);
(Continued)

(58) Field of Classification Search
CPC ...... F16K 31/04; F16K 31/047; F16K 31/504; F16K 31/506; F16H 25/04; F16H 25/20;
(Continued)

(56) References Cited

U.S. PATENT DOCUMENTS

| 2,818,743 | A | * | 1/1958 | Zatsky | ................. F16H 25/04 |
| | | | | | 74/1 R |
| 4,024,890 | A | * | 5/1977 | Yasuoka | ............... F16K 1/221 |
| | | | | | 137/556.3 |

(Continued)

FOREIGN PATENT DOCUMENTS

| DE | 4219660 | 1/1994 |
| DE | 102007048928 | 4/2009 |

(Continued)

OTHER PUBLICATIONS

Search Report of German application No. 10 2016 203 265.8 dated Mar. 7, 2018, 9 pages.
(Continued)

*Primary Examiner* — Matthew W Jellett
(74) *Attorney, Agent, or Firm* — Rankin, Hill & Clark LLP

(57) ABSTRACT

The present invention provides an adjustment arrangement (10), comprising a rotating input element (26) at which a first torque from a motor arrangement (18, 22) can be inputted into the adjustment arrangement, a rotating output element (16) at which a second torque can be outputted by the adjustment arrangement, and a transmission portion for converting the first torque into the second torque, the transmission portion comprising a transmission means (32) having a first threaded portion (30) and a second threaded portion (34), the first threaded portion converting a rotation of the input element (26) into an axial movement of the transmission means, and the second threaded portion converting an axial movement of the transmission means into a rotation of the output element (16).

13 Claims, 7 Drawing Sheets

(51) Int. Cl.
*F16H 25/24* (2006.01)
*F16K 31/04* (2006.01)
*F16K 31/50* (2006.01)
*F16H 35/10* (2006.01)
*E05F 15/622* (2015.01)

(52) U.S. Cl.
CPC ......... *F16H 25/20* (2013.01); *F16H 25/2021* (2013.01); *F16H 25/24* (2013.01); *F16H 35/10* (2013.01); *F16K 31/047* (2013.01); *F16K 31/506* (2013.01); *E05Y 2201/216* (2013.01); *F16H 2025/2028* (2013.01); *F16H 2025/2059* (2013.01); *F16H 2025/2071* (2013.01); *F16H 2025/2075* (2013.01)

(58) Field of Classification Search
CPC .. F16H 25/2021; F16H 25/2056; F16H 25/24; F16H 35/10; F16H 2025/2028; F16H 2025/2059; F16H 2025/2071; F16H 2025/2075; E05F 15/622; E05Y 2201/216
USPC ............................ 251/129.11, 265, 267, 268
See application file for complete search history.

(56) References Cited

U.S. PATENT DOCUMENTS

| | | | | |
|---|---|---|---|---|
| 6,253,632 | B1* | 7/2001 | Poulek | E06B 9/72 74/89.23 |
| 9,097,056 | B2* | 8/2015 | Kummer | E05F 15/622 |
| 9,500,236 | B2* | 11/2016 | Muller | F16D 7/024 |
| 9,810,341 | B2* | 11/2017 | Lenz | F16K 31/047 |
| 2010/0108925 | A1* | 5/2010 | Kannoo | F16K 11/074 251/129.11 |
| 2011/0226001 | A1* | 9/2011 | Kannoo | F16K 11/074 62/324.6 |
| 2012/0138029 | A1* | 6/2012 | Albert | F02D 9/12 123/568.23 |
| 2016/0258660 | A1* | 9/2016 | Zhang | F16K 31/0651 |

FOREIGN PATENT DOCUMENTS

| | | |
|---|---|---|
| DE | 102008005229 | 7/2009 |
| DE | 102009055959 | 2/2012 |
| DE | 102014100125 | 7/2015 |
| FR | 2992497 | 12/2013 |
| WO | 2014111065 A2 | 7/2014 |

OTHER PUBLICATIONS

Extended European Search Report (EESR) of application No. 17 157 325.6 dated Mar. 23, 2018, 12 pages.
Partial European Search Report of European Serial No. 17157325.6 dated Oct. 27, 2017, 13 pages.

* cited by examiner

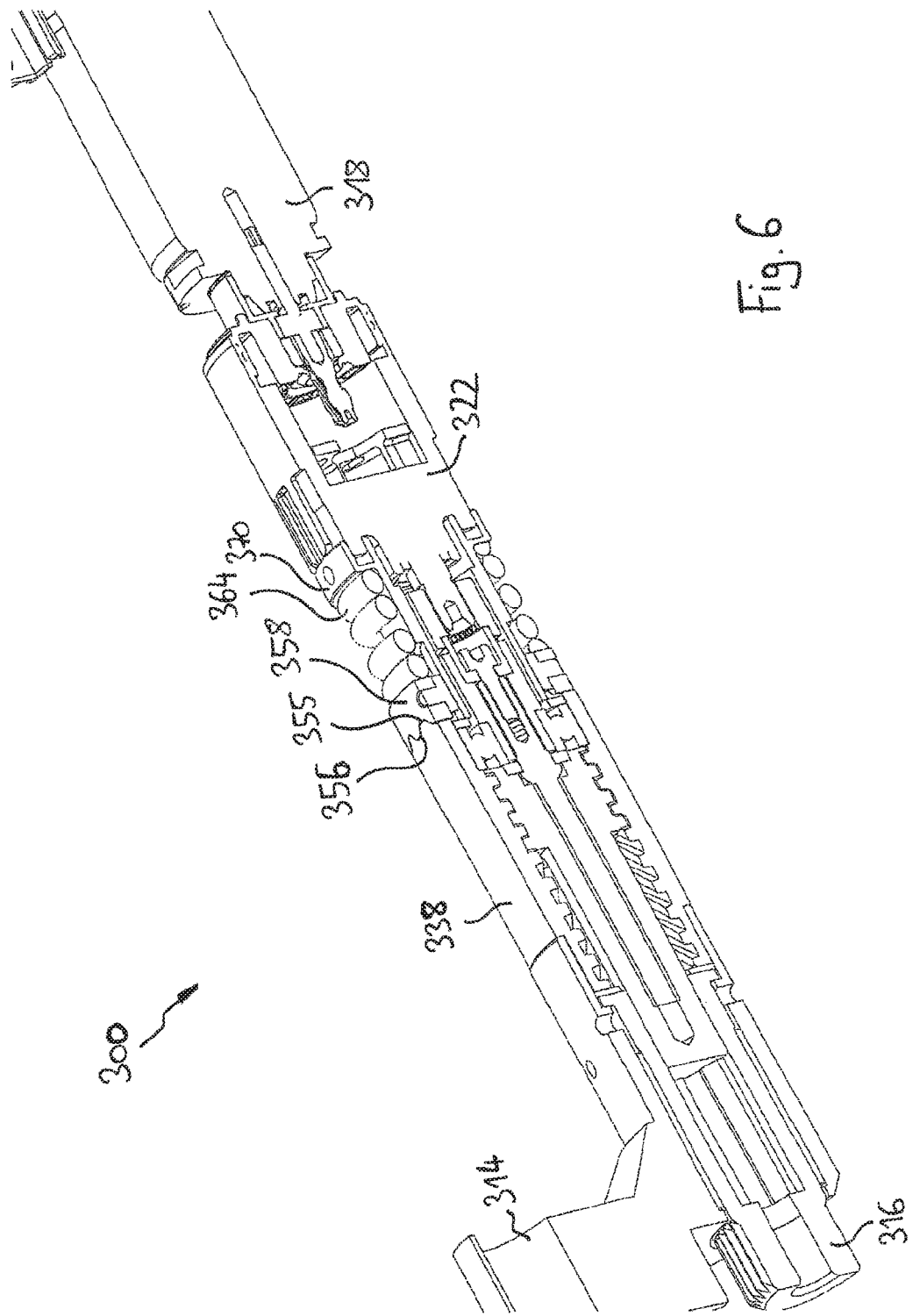

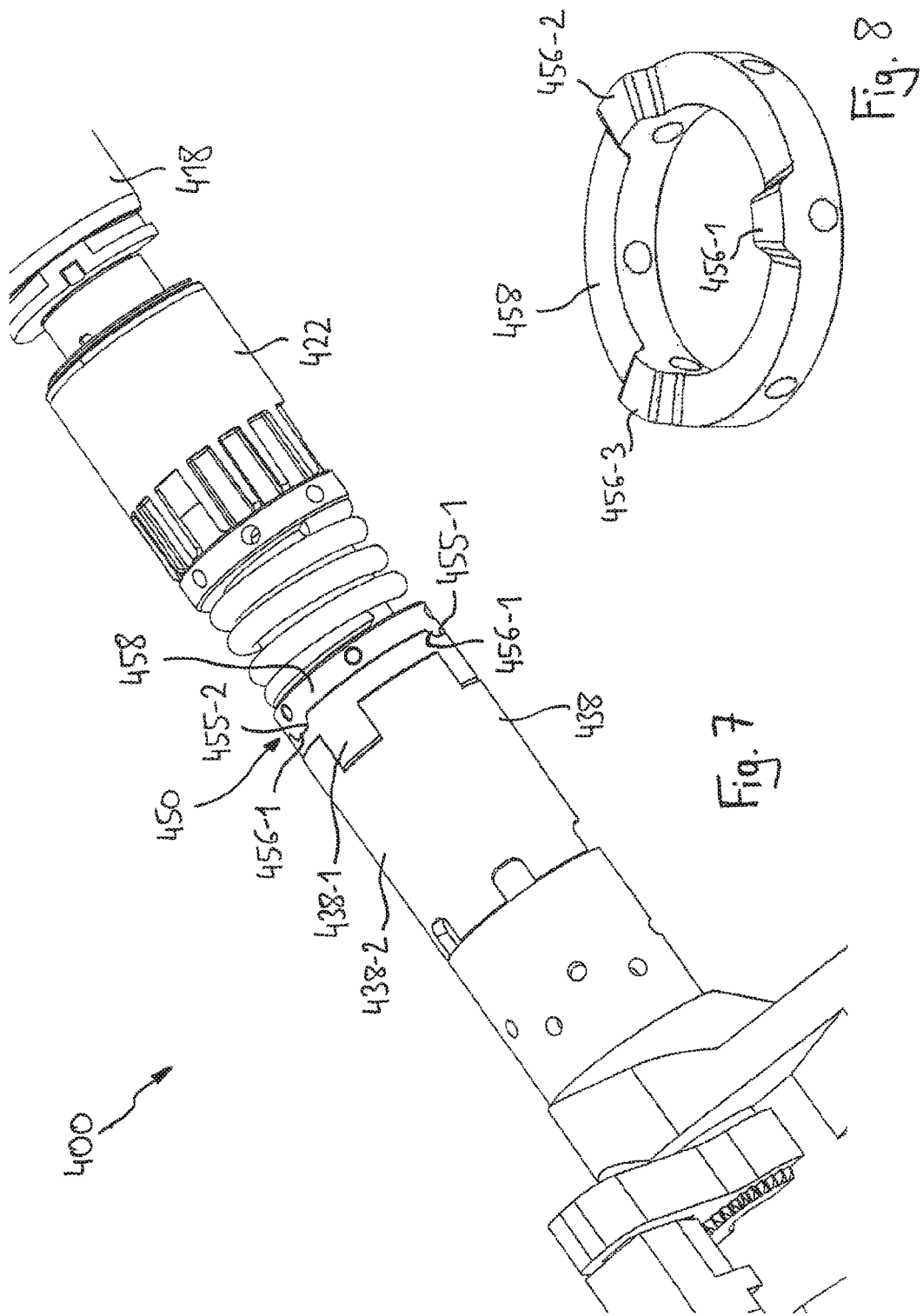

ADJUSTMENT ARRANGEMENT AND VALVE CONTROL DEVICE COMPRISING AN ADJUSTMENT ARRANGEMENT

BACKGROUND

The present invention relates to an adjustment arrangement comprising a rotating input element at which a first torque from a motor arrangement can be inputted into the adjustment arrangement, a rotating output element at which a second torque can be outputted by the adjustment arrangement, and a transmission portion for converting the first torque into the second torque. Further, the present invention relates to a valve control system for controlling the movement of a valve relative to a base portion at a predetermined pivot angle, the valve control device comprising an adjustment arrangement of the aforementioned type.

Adjustment arrangements of the aforementioned type are known in the prior art as electromechanical actuators, and generally use a planetary transmission to convert the relatively rapid rotation of an output shaft of an electric motor into a slower rotation of an output element of the actuator. However, planetary transmissions are relatively expensive and high-maintenance for construction reasons, since they require a number of gear wheels movable on different shafts. Furthermore, the transmission ratio (reduction ratio or multiplication ratio) of planetary transmissions is limited depending on the available installation space. Adjustment arrangements are further known which comprise a worm gearing so as to achieve a relatively high reduction ratio. However, for construction reasons, worm gearings require the mounting of two shafts arranged at an angle to one another, and so in this case too there is an increased complexity of construction and increased installation space requirement.

BRIEF DESCRIPTION

An object of the present invention is to provide an adjustment arrangement of the aforementioned type which makes possible a torque conversion at a relatively high transmission ratio and simultaneously takes up little installation space and can be produced with a low complexity of construction.

Further, an object of the present invention is to provide a valve control system by means of which the movement of a valve relative to a base portion can be controlled, it being intended for the valve control device to be cost-effective and compact.

In a first aspect, the aforementioned object of the invention is achieved by an adjustment arrangement comprising a rotating input element at which a first torque from a motor arrangement can be inputted into the adjustment arrangement, a rotating output element at which a second torque can be outputted by the adjustment arrangement, and a transmission portion for converting the first torque into the second torque, the transmission portion comprising a transmission means having a first threaded portion and a second threaded portion, the first threaded portion converting a rotation of the input element into an axial movement of the transmission means and the second threaded portion converting an axial movement of the transmission means into a rotation of the output element, and the first threaded portion and the second threaded portion having different thread pitches from one another.

Thus, in accordance with an important feature of the present invention, an axially movable transmission means is provided, which is set in axial movement by the rotation of the input element, and which in turn converts this axial movement into a rotation of the output element. The first and second threaded portions of the transmission means which are used for this purpose have different thread pitches from one another, resulting in conversion of the torque, in other words multiplication or reduction of the rotation of the input element into the rotation of the output element. In particular, the arrangement according to the invention makes possible a coaxial arrangement of the axes of rotation of the input element and output element to simplify the mounting arrangements for the elements involved. Further, the selection of different thread pitches makes it possible to implement the adjustment arrangement according to the invention in a simple construction and with a compact design. Depending on the formation of the threaded portions and the thread pitches, very high transmission ratios can also be implemented in a simple manner.

In a preferred embodiment, it is provided that the transmission means comprises a spindle nut and that the first threaded portion and the second threaded portion are formed on different portions of the spindle nut, preferably one of the two threaded portions forming an internal thread of the spindle nut and the other threaded portion forming an external thread of the spindle nut. This embodiment makes possible a particularly simple construction, since in particular the two threaded portions can be formed on the same component, a spindle nut. In particular, a single-piece or integral element, for example the spindle nut, may be provided as a transmission means, further reducing the production costs and making it possible to implement a particularly compact design.

The adjustment arrangement may have a primary axis about which the input element and the output element rotate and along which the transmission means is also axially displaceable. This variant not only makes it possible to produce a particularly simple and cost-effective adjustment arrangement, but can further be used in the form of an elongate, in particular cylindrical, adjustment arrangement, such that the structure thereof has a shape that is favourable in particular for use in a valve control device for controlling the movement of a valve.

Preferably, the input element is in threaded engagement with the first threaded portion of the transmission means and/or the output element is in threaded engagement with the second threaded portion of the transmission means, such that a direct transmission between the relevant elements reduces frictional losses and contributes to a reduction in the necessary components. In particular, the actual transmission portion can thus be produced using substantially only three movable elements; the input element, the transmission means and the output element.

In a further embodiment of the present invention, the second threaded portion may be engaged with a threaded element fixed to the housing. In further embodiments of the invention, the transmission means may be connected in an axially displaceable but rotationally engaged manner to the input element and/or the output element and/or a portion fixed to the housing. Measures of this type make it possible to decouple the axial movement of the transmission means from the input element and/or the output element and/or the housing.

The adjustment arrangement may further comprise a motor arrangement, by means of which the input element is rotatably driven. If the motor arrangement is part of the adjustment arrangement, the mechanical or movable components form a constructional unit which is easy to assemble, and which in particular only remains to be electrically contacted. Positioning and rotationally engaged mounting between the motor arrangement and the input element are not required. Alternatively, the input element of the adjustment arrangement can be set up to be coupled in a rotationally engaged manner to an output shaft of a motor arrangement, such that the motor arrangement is not part of the adjustment arrangement in this case.

If the adjustment arrangement comprises the motor arrangement in a constructional unit, the motor arrangement preferably comprises a motor and a transmission, the output element of the motor being inputted into the transmission and an output torque of the transmission driving the input element. Thus, an additional conversion step for the torque of the motor can be provided, so as for example to achieve a particularly high transmission ratio of the adjustment arrangement as a whole. This is relevant in particular for a planetary transmission, which in this case is in particular arranged axially between the motor and the rotating input element.

In a further preferred embodiment of the invention, the adjustment arrangement further comprises an overload control means, which is set up to interrupt a rotational coupling between the output element and the motor arrangement, or at least to reduce it over a particular angle-of-rotation range, in the event of an overload, in which a torque exceeding a predetermined overload torque for the adjustment arrangement is inputted at the output element. The overload control in particular prevents damage to the adjustment arrangement and in particular to a motor arrangement in the event of an unexpectedly or unintendedly large torque acting at the output element. If the adjustment arrangement is for example part of a valve control device for controlling and moving a valve, the overload control means may prevent damage to the adjustment arrangement or the motor arrangement if a relatively large external force, in particular due to inappropriate manual actuation of the valve, acts on the valve and thus an excessive torque acts on the output element. The overload control means may be arranged in a torque-transmitting manner between the input element and the motor arrangement or upstream from the input element, such that a motor arrangement is to be connected to the overload control means. In this way, the motor arrangement is protected effectively against overload, without major constructional changes to the transmission portion being necessary for this purpose.

However, the arrangement of the overload control means between the input element and the motor arrangement requires a relatively high tolerance of the overload control means, since in this case the transmission portion is arranged between the action point of the external torque, specifically the output element, and the overload control means, and the overload control means thus has to already be effective at relatively low torques. This also applies to an embodiment in which the overload control means is arranged between a motor of the motor arrangement and a downstream first transmission of the motor arrangement, for example a planetary transmission. In an alternative variant, the overload control means may be arranged between the output element and the input element, so as to prevent the aforementioned drawback. In other words, in different operating states, the installation position of the overload control means acts along the force transmission chain of the motor, the first planetary transmission (if present), the input element, the transmission portion and the output element on the output-side overload torque of the adjustment arrangement as follows: the difference between the output-side overload torque for motor drive and the overload torque for force action on the output element increases with increasing distance of the overload coupling from the output element.

In a variant of the invention, in which the overload control means is shifted a relatively long way towards the output element in the above-disclosed force transmission chain, it may be provided that the second threaded portion is engaged with a threaded element, the threaded element being held in a rotationally engaged manner with respect to a housing of the adjustment arrangement by the overload control means during normal operation, i.e. when a torque between the output element and the motor arrangement is less than a predetermined overload torque, and the threaded element being released for rotation relative to the housing by the overload control means in the event of overload, i.e. when the torque between the output element and the motor arrangement is greater than or equal to the predetermined overload torque. Since the second threaded portion is arranged on the output-element side in the torque transmission path of the transmission portion, this measure shifts the overload control means towards the output element, in other words towards where the excess torque is actually inputted into the adjustment arrangement.

In a further embodiment of the present invention, it may be provided that the overload control means comprises an axially movable coupling element, which is shifted in an axial direction counter to a restoring force, so as to interrupt torque transmission via the coupling element, in the event of overload, i.e. when a torque between the output element and the motor arrangement is greater than or equal to the predetermined overload torque. Using a movable coupling element of this type, torque transmission can be interrupted in the event of overload using simple mechanical means.

In a second aspect of the present invention, the aforementioned object of the invention is achieved by a valve control device for controlling the movement of a valve relative to a base portion at a predetermined pivot angle, preferably an angle 180 degrees, the valve control device comprising a valve holder, on which a valve is provided or is mountable, and an adjustment arrangement according to the first aspect of the invention, the valve holder being arranged on the output element, the adjustment arrangement comprising a housing in which the transmission means, the input element and a motor arrangement for rotatably driving the input element are accommodated, and the housing comprising holding means for holding the housing securely on the base portion during operation.

In the second aspect of the invention, the aforementioned advantages of an adjustment arrangement according to the invention from the first aspect of the invention are exploited in the application as a valve control device. Accordingly, the valve control device of the second aspect of the invention has a compact design and a simple construction and makes possible a relatively high transmission ratio for the controlled pivot movement of the valve at a desired speed. The housing may simultaneously be used both as a housing and rigid component of the adjustment arrangement and further also for mechanical bracing between the base portion and the valve, in other words for supporting the valve.

In a preferred embodiment of the invention of the second aspect, the valve control device comprises an adjustment arrangement having an axially movable coupling element, such as was described above in relation to a variant of the first aspect of the invention. In a device of this type, the pivot angle of the valve can thus be limited to values within a predetermined operating angle, the coupling element comprising a toothing which can engage with an associated counter toothing of the adjustment arrangement so as to block relative rotation between the coupling element and the counter toothing, two adjacent engagement positions between the toothing and the counter toothing forming an angle, in the direction of rotation of the coupling element, which is greater than the operating angle. A valve control device of this type has the advantage that in the event of an overload, although the coupling element does slip out and the motor continues to rotate without entraining the valve, the coupling element is brought back into the same relative position in relation to the other moving elements of the transmission portion, in particular the transmission means and the output element, when the valve actuation device is subsequently replaced, for example when the valve is moved onwards after eliminating the blockage, since within the operating angle of the valve only a single relative position of this type is possible for normal operation.

BRIEF DESCRIPTION OF THE DRAWINGS

The present invention is described in greater detail in the fallowing by way of preferred embodiments, with reference to the accompanying drawings, in which:

FIG. 6 is a view according to FIG. 5, but without the housing, FIG. 7 is a perspective view of an adjustment arrangement according to a fifth embodiment of the present invention, and FIG. 8 is a perspective view of a coupling wheel of the adjustment arrangement of the fifth embodiment.

DETAILED DESCRIPTION

Figure 1:
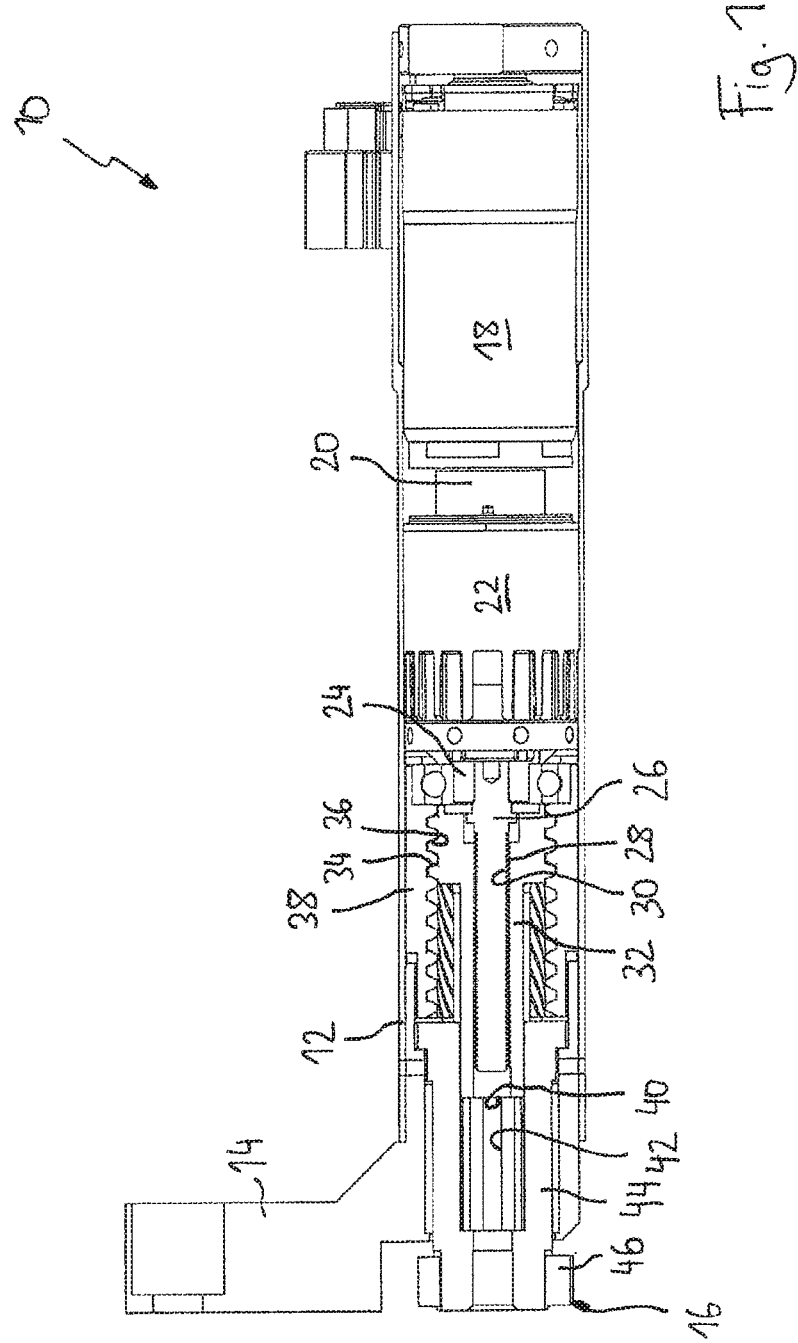
FIG. 1 is a sectional view of an adjustment arrangement according to a first embodiment of the invention in a sectional plane along a primary axis of the adjustment arrangement.
Figure 2:
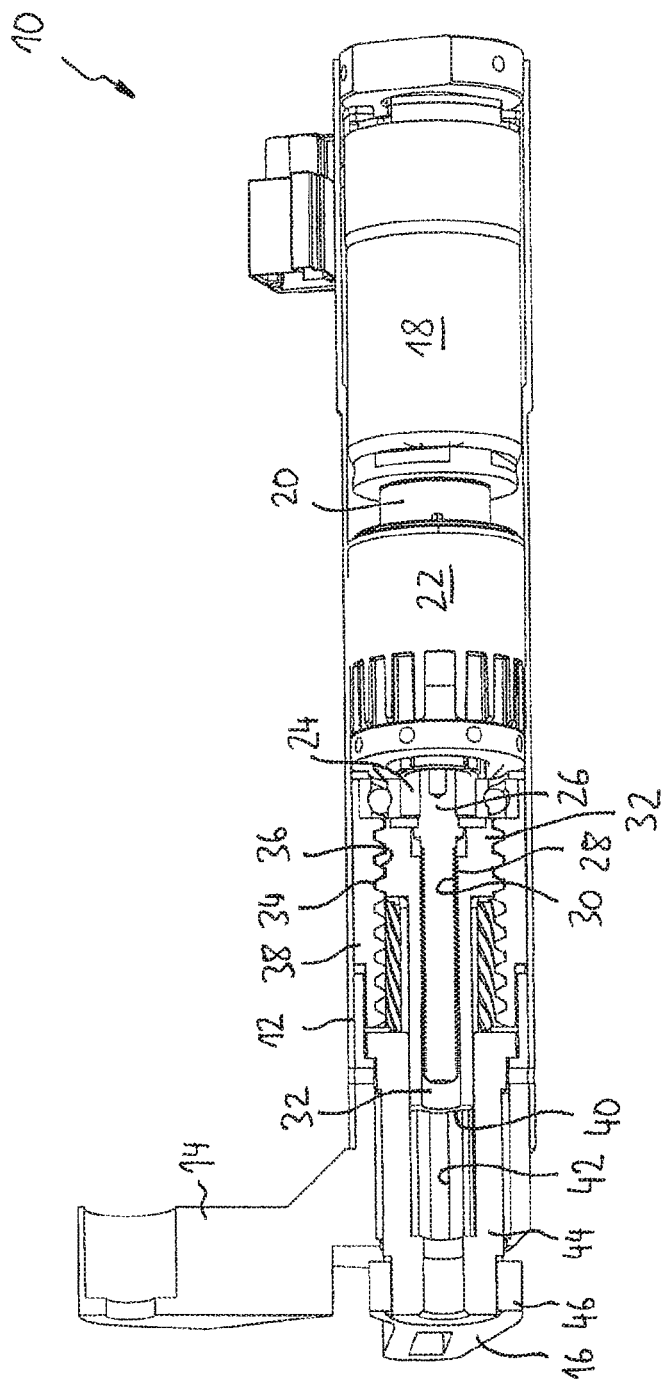
FIG. 2 is a perspective, partially sectional view of the adjustment arrangement of the first embodiment.

An adjustment arrangement according to the first embodiment of the invention, generally denoted as 10 in FIGS. 1 and 2, comprises a housing 12 comprising a fastening portion 14 for fastening the adjustment arrangement 10 to an external component (not shown), for example a base portion or frame of a valve arrangement. A torque generated by the adjustment arrangement 10 is outputted at a driven element 16, which in the case of application in a valve control device may be fastened to a valve or may be formed by a valve, such that the adjustment arrangement 10 can pivot the valve relative to the base portion. The driven element 16 may be formed as a driven lever.

Drive energy for the adjustment arrangement may be provided by a motor 18, which in the embodiment is an electric motor received in the housing 12. An output shaft 20 of the motor 18 is preferably coupled to a transmission 22, so as to achieve a first torque conversion, in particular so as to convert the relatively high output rotational speed of the motor 18 into a lower rotational speed of a transmission output shaft 24. The transmission 22 is preferably a planetary transmission, and thus makes possible coaxial transfer of the torque from the motor output shaft 22 to the transmission output shaft 24 at a relatively high conversion ratio.

The motor 18 and the transmission 22 form a motor arrangement within the meaning of the present invention, which provides a first torque at an input element 26. The motor arrangement may alternatively merely be formed by a motor, in other words without a transmission, or may use another form of transmission instead of the planetary transmission 22.

In the first embodiment of the invention, the input element 26 is provided with an external thread 28 and may in particular be formed as a spindle, which is mounted so as to be axially rigid and rotatable about the primary axis A with respect to the housing 12. The external thread 28 of the spindle 26 is engaged with an internal thread 30 of a transmission means 32. The transmission means 32 further comprises an external thread 34, which is in turn engaged with an internal thread 36 of a threaded sleeve 38 fixed to the housing. The threaded sleeve 38 is fastened in the housing 12 or is formed by the housing 12 itself.

The internal thread 30 of the transmission means 32 has a thread pitch which is different from, in the embodiment in particular less than, a thread pitch of the external thread 34 of the transmission means 32. Correspondingly, the thread pitch of the external thread 28 of the input element 26 is also different from, in particular less than, the internal thread 36 of the threaded sleeve 38. The transmission means 32 is guided in a rotatable and axially movable manner between the input element 26 and the threaded sleeve 38. As a result, a rotational movement of the input element 26, driven by the motor arrangement 18, 22, leads to an axial movement of the transmission means 32, the restricted guidance between the transmission means 32 and threaded sleeve 38 superposing a rotational movement, corresponding to the thread pitch of the internal thread 36 of the threaded sleeve 38, on this axial movement. Since the pitch of this internal thread 36 is much greater than the pitch of the external thread 28 of the input element 26, the transmission means 32 rotates at a rotational speed much less than the rotational speed of the input element 26.

The transmission means 32 is coupled to the driven element 16 in a torque-transmitting manner so as to rotatably drive the driven element 16. Preferably, however, the coupling between the transmission means 32 and the driven element 16 is configured such that the axial movement component of the transmission means 32 is not transmitted to the driven element 16, so as to provide purely a rotational movement at the driven element 16 such as is desired for example for actuating a valve. The transmission means 32 can thus be coupled to the driven element 16 in a torque-transmitting but axially displaceable manner. For this purpose, an axial toothing 40 on an external circumference of the transmission means 32 may be engaged with a matching axial toothing 42 on an internal circumference of the driven element 16, such that the transmission means can be displaced into or pulled out of the driven element 16 in an axial direction, but cannot rotate relative to the driven element 16. In the illustrated embodiment, the driven element 16 may comprise a hollow shaft 44 in which the axial toothing 42 is formed, and may further comprise a driven lever 46 which is fastened to the hollow shaft 44.

The adjustment arrangement 10 constructed in this manner makes possible a relatively large rotational speed reduction, in other words a transmission portion having a relatively high transmission ratio, by means of a simple and compact structure. It can further be seen in FIG. 1 that the internal thread 30 and the external thread 34 of the transmission means 32 may overlap in an axial direction and/or the internal thread 36 of the threaded shaft 38 and the external thread 28 of the input element 26 can overlap axially, such that the total length of the adjustment arrangement 10 can be reduced along the primary axis A of the adjustment arrangement 10 (axis of rotation of the input element 26). FIG. 1 further illustrates that the transmission element 32 may be formed from a single-piece spindle nut and can thus be produced in a particularly simple and cost-effective manner. Further, the axes of rotation of substantially all rotatable parts of the adjustment arrangement 10 are preferably orientated so as to be mutually parallel and generally also coaxial. In particular, the axes of rotation of the motor output shaft 20, the transmission output shaft 24, the input element 26, the transmission means 32 and the driven element 16 are all positioned on the primary axis A of the adjustment arrangement 10, making possible a stable and compact arrangement and making possible accommodation in a substantially cylindrical housing 12.

Figure 3:
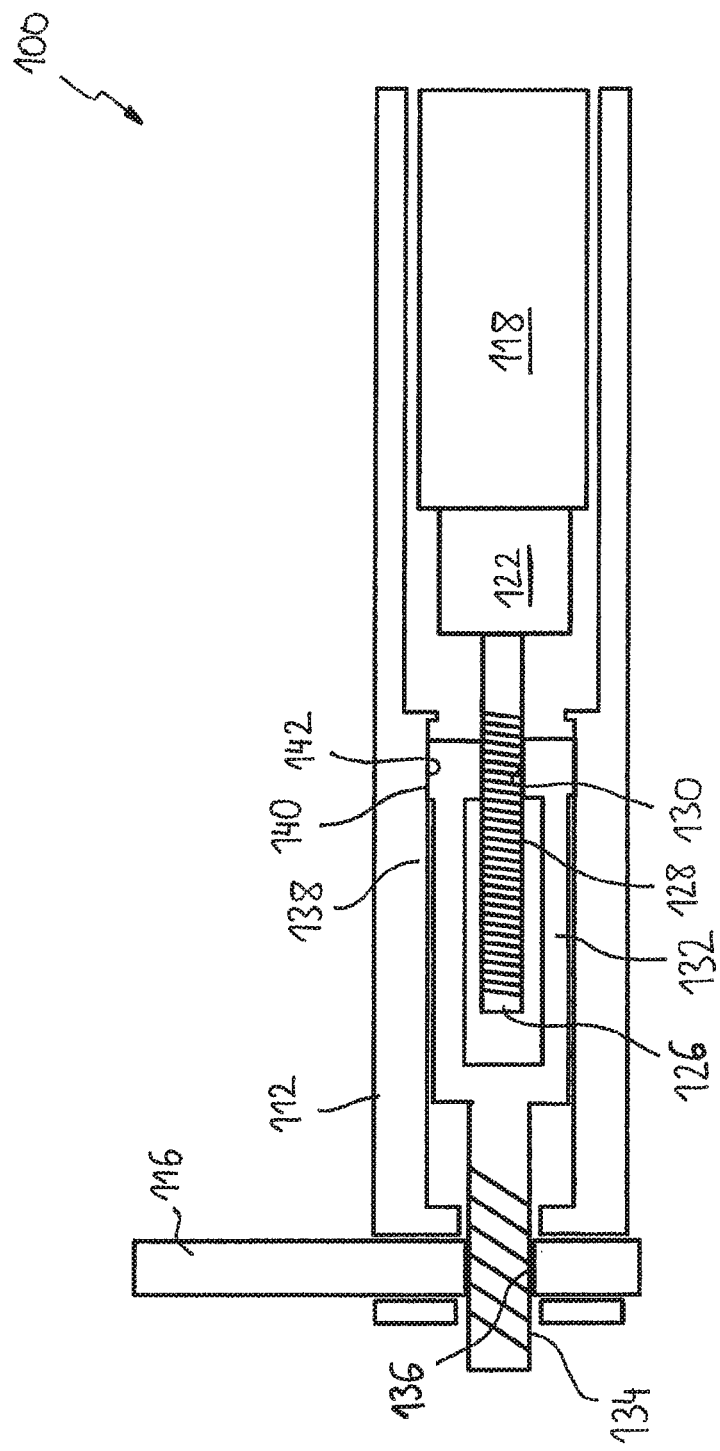
FIG. 3 is a sectional view of an adjustment arrangement according to a second embodiment of the invention in a sectional plane along a primary axis of the adjustment arrangement.

In the following, a second embodiment of the present invention is disclosed with reference to FIG. 3. In doing so, only the differences from the first embodiment are discussed in detail in the following. As regards the construction and mode of operation of all other components of the adjustment arrangement, reference is hereby expressly made to the above description of the first embodiment.

An adjustment arrangement 100 of the second embodiment comprises a housing in which a motor 118 and a transmission 122 are accommodated. The motor arrangement formed by the motor 118 and the transmission 122 provides a torque for driving an input element 126, which may in turn be formed as a threaded spindle comprising an external thread 128. The external thread 128 of the input element 126 is in threaded engagement with the internal thread 130 of a transmission means 132. The transmission means 132 is guided in a rotationally engaged but axially displaceable manner with respect to the housing 112 of the adjustment arrangement 100. For this purpose, in particular an axial toothing 140 on an external circumference of the transmission means 132 may be guided in an axial toothing 142 on the internal circumference of a guide sleeve 138 fixed to the housing. The guide sleeve 138 may alternatively be formed by the housing 112, for example if the axial toothing 142 is formed directly on an internal circumference of the housing 112.

The transmission means 132 further comprises a second thread, in particular an external thread 134, which is engaged with an internal thread 136 of a driven element 116. The driven element 116 is held in a rotatable but axially displaceable manner with respect to the housing 112.

A thread pitch of the external thread 134 of the transmission element 132 is different from, in particular greater than, a thread pitch of the internal thread 130 of the transmission means 132.

During operation of the adjustment arrangement 100, the motor arrangement 118, 122 generates a first torque, which is inputted at the input element 126 and sets the input element 126 into rotation. As a result of the axial guidance 140, 142, this rotational movement sets the transmission means 132 in a (purely) axial displacement movement along the axis of rotation A of the input element 126. Finally, the axial displacement of the transmission means 132 is converted into a rotational movement of the driven element 116 by means of the threaded engagement between the external thread 134 of the transmission means 132 and the internal thread 136 of the driven element 116. Because of the different thread pitches between the internal thread 130 and the external thread 134 of the transmission means 132, a particular axial displacement distance of the transmission means 132 leads to a much smaller angle of rotation of the driven element 116 or a much slower rotation of the driven element 116.

Figure 4:
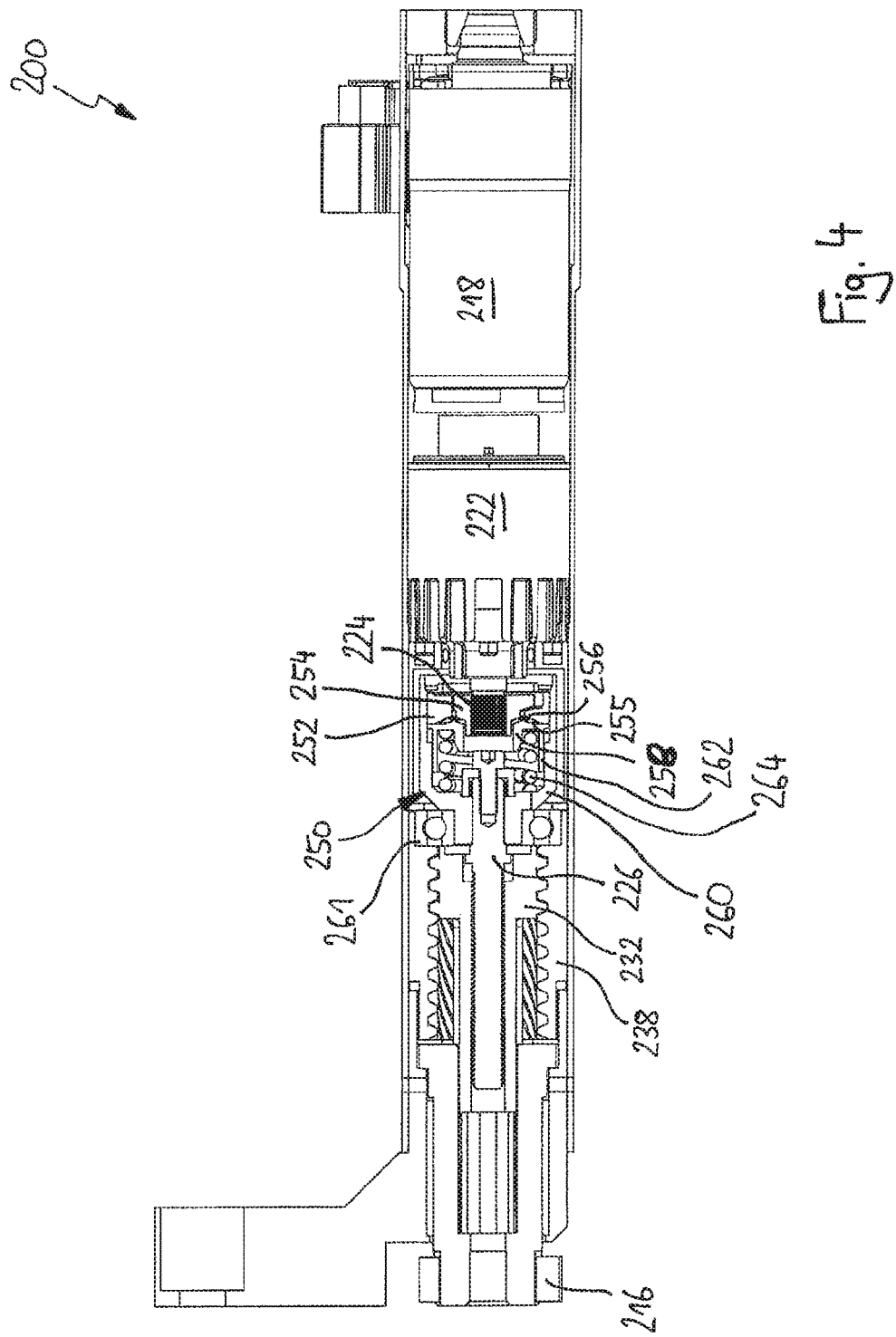
FIG. 4 is a sectional view of an adjustment arrangement according to a third embodiment of the invention in a sectional plane along a primary axis of the adjustment arrangement.

In the following, a third embodiment of the present invention is disclosed with reference to FIG. 4. The third embodiment is based on the construction of the first embodiment (FIGS. 1 and 2). Only the differences from the first embodiment are discussed in detail in the following, and as regards all components and functions of the adjustment arrangement which are not described again, reference is hereby expressly made to the description of the first embodiment.

An adjustment arrangement 200 of the third embodiment comprises a motor arrangement comprising a motor 218 and a transmission 222 for providing a first torque, which is inputted to an input element 226. A transmission portion for converting this first torque at the input element 226 into a second torque at a driven element 216 comprises, just as in the first embodiment, the input element 226, a transmission means 232, a threaded sleeve 238 and the driven element 216. However, the transmission portion between the input element 226 and the driven element 216 may be of a different configuration. Unlike in the first embodiment, the adjustment arrangement 200 of the third embodiment comprises an overload coupling 250, which is arranged between a transmission output shaft 224 of the motor arrangement 218, 222 and the input element 226, so as to interrupt the torque transmission path, or make relative rotation possible between the driven element 216 and the transmission output shaft 224, in the event of a torque which exceeds a predetermined overload torque acting between the driven element 216 and the motor arrangement 218, 222. In this way, if a high external force is applied, for example if a valve actuated by the driven element 216 is running counter to an external resistance, an overload on the motor arrangement 218, 222 is prevented.

The overload coupling 250 comprises a carrier wheel 252, which is rotationally engaged with the transmission output shaft 224 and for this purpose is either fastened directly on the transmission output shaft 224 or supported on an adapter wheel 254 which is mounted on the transmission output shaft 224. The carrier wheel 252 comprises a toothing 255 which projects out from an end face of the carrier wheel 252 in an axial direction. The toothing 250 of the carrier wheel 252 engages in a corresponding toothing 256 of a coupling wheel 258, which is likewise formed protruding in an axial direction on an end face of the coupling wheel 258 facing the carrier wheel 252. The toothings 255, 256 comprise teeth and notches having oblique or round flanks in each case, preferably V-shaped tooth flanks and notch flanks. If the toothing 255 of the carrier wheel 252 and the toothing 256 of the coupling wheel 258 are engaged with one another, a relative rotation between the carrier wheel 252 and the coupling wheel 258 can force an axial separation of the carrier wheel 252 and the coupling wheel 258 and thus a release of the toothings 255, 256, in that the aforementioned oblique faces of the toothings 255, 256 slide along on one another.

The overload coupling 250 further comprises a coupling output wheel 260, which is held, rotatable on a bearing 261 and axially unmovable, in the housing 212. The coupling wheel 258 is held in a rotationally engaged but axially displaceable manner on the coupling output wheel 260. In particular, axial notch toothings 262 may be provided on the coupling wheel 258 and on the coupling output wheel 260, and are engaged with one another and ensure that the coupling wheel 258 and the coupling output wheel 260 can be displaced relative to one another in an axial direction, but a relative rotation of the two components is blocked. By way of a spring 264, which can be braced both on the coupling output wheel 260 and on the coupling wheel 258, the coupling wheel 258 is preferably biased towards the carrier wheel 252, in other words towards an engagement of the toothings 255, 256. The coupling output wheel 260 is preferably rotationally engaged with or formed integrally with the input element 226.

In the following, the mode of operation of the overload coupling 250 is described. During normal operation, when the motor arrangement 218, 222 is driven to move the driven element 216 and a resistance on the part of the driven element 216, which is less than a predetermined overload torque, opposes this rotational movement, the spring 264 holds the coupling wheel 258 in engagement with the carrier wheel 252, such that the rotational movement of the transmission output shaft 224 is transmitted via the carrier wheel 252, the coupling wheel 258 and the coupling output wheel 260 to the input element 226, and after torque conversion the driven element 216 is rotatably driven. If the driven element 216 is blocked by an external force or if a torque which exceeds the predetermined overload torque acts in some other way between the driven element 216 and the motor arrangement 218, 222, i.e. if an overload occurs, this external torque is inputted into the overload coupling 250 via the driven element 216, the transmission means 232 and the input element 226, and transmitted to the coupling output wheel 260 and the coupling wheel 258. The torque difference between the coupling wheel 258 and the carrier wheel 254 connected to the motor arrangement 218, 222 subsequently leads to the oblique faces or roundings of the toothings 255, 256 sliding along and to the engagement between the coupling wheel 258 and the carrier wheel 254 being separated counter to the force of the spring 264. The overload coupling 250 subsequently makes rotation possible between the coupling wheel 258 and carrier wheel 252 over the teeth of the toothings 255, 256, such that the torque coupling is interrupted at this point. Once the external torque is removed or reduced to a level below the predetermined overload torque, the overload coupling 250 engages again by virtue of the spring 264, and the adjustment arrangement 200 can be operated normally again.

Figure 5:
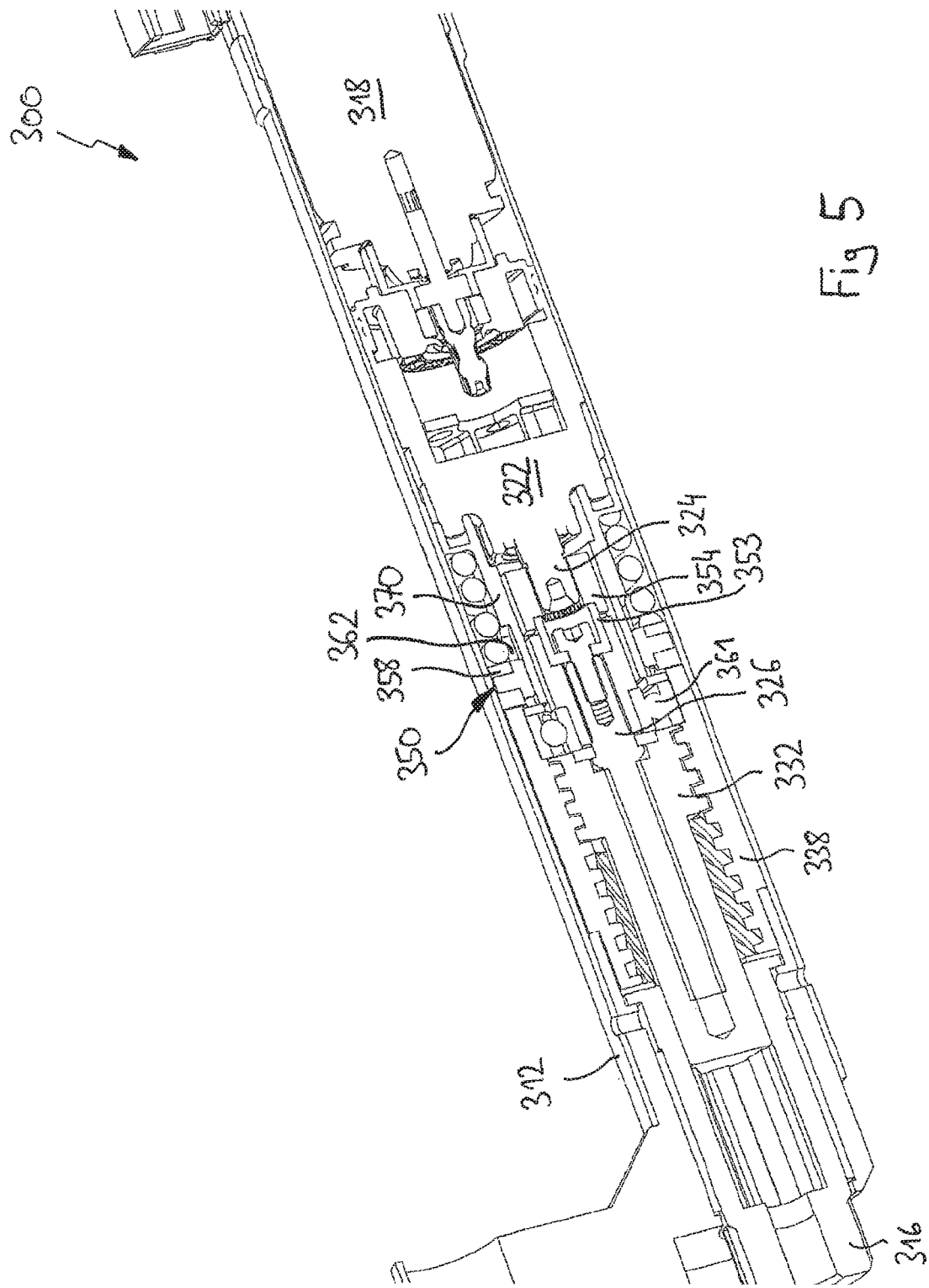
FIG. 5 is a sectional perspective view of an adjustment arrangement according to a fourth embodiment of the invention in a sectional plane along a primary axis of the adjustment arrangement.

In the following, a fourth embodiment of the present invention is disclosed with reference to FIGS. 5 and 6. The fourth embodiment is a modification to the third embodiment, and so only the differences from the third embodiment are discussed in detail in the following, and otherwise reference is hereby expressly made to the descriptions of the third and first embodiments.

An adjustment arrangement 300 of the fourth embodiment comprises a motor arrangement comprising a motor 318 and a transmission 322 which provides a first torque at a transmission output shaft 324. By way of a transmission portion, which as in the first and third embodiments comprises an input element 326, a transmission means 332, a threaded sleeve 338 and a driven element 316, this first torque is converted into a second torque at the driven element 316. In this case too, the transmission portion can be implemented using a different construction principle for torque conversion.

In the fourth embodiment too, the adjustment arrangement 300 comprises an overload coupling 350. Unlike in the third embodiment, however, in the fourth embodiment the transmission output shaft 324 is rotationally engaged with the input element 326; in particular, these shafts are fixed with respect to one another during operation. In the embodiment, an adapter element 354 is fastened to the transmission output shaft 324 and carries a connection element 353, which is in turn fastened to the input element 326 by means of a screw. Alternatively, the transmission output shaft 324 could be fastened directly to the input element 326, or the transmission output shaft 324 could itself form the input element 326 directly. The input element 326 may be braced rotating on a bearing 361 with respect to the housing 312 or with respect to the threaded sleeve 338.

A carrier part 370 fixed with respect to the housing 312 carries a coupling wheel 358 on an axial guide 362, such that the coupling wheel 358 is held so as to be displaceable in an axial direction relative to the carrier part 370 and thus relative to the housing 312 but rotationally engaged. The carrier part 370 may either be fastened directly in the housing 312 or, as in the third embodiment, be fastened to the transmission 322, such that, in order to allow simple mounting, it can be slid into or removed from the housing 312 together with the motor arrangement.

As can be seen in particular in FIG. 6, the coupling wheel 358 comprises, on an end face facing in an axial direction, a toothing 356 which can be brought into engagement with a matching toothing 355, which is provided on an end face of the transmission sleeve 338 facing in an axially opposed direction. The teeth of the toothings 355, 356 project from the respective components 338, 358 thereof, in other words in an axial direction in each case, and face one another. It can further be seen that the tooth flanks or notch flanks of the toothings 355, 356 are bevelled or rounded, in other words are at an angle to the axial shaft, such that in the event of a relative rotation between the coupling wheel 358 and the threaded sleeve 338 the oblique faces or roundings slide along on one another and the two elements are forced apart from one another until the tooth engagement is released. A spring 364, which is braced both on the carrier part 370 and on the coupling wheel 358, tensions the coupling wheel 358 towards the threaded sleeve 338 in an axial direction so as to hold the toothings 355, 356 in engagement with one another.

By contrast with the construction of the first and third embodiments, in the fourth embodiment the threaded sleeve 338 is not fastened in a rotationally engaged manner in the housing 312, but can rotate with respect to the housing 312. In normal operation, in other words when an external torque less than a predetermined overload torque acts between the driven element 316 and the motor arrangement 318, 322, the spring 364 holds the coupling wheel 358 in engagement with the threaded sleeve 338, such that the threaded sleeve 338 is held in a rotationally engaged manner relative to the housing 312, and the adjustment arrangement 300 can be operated in the same way as described in the first embodiment. In the event of overload, when a torque greater than the predetermined overload torque acts between the driven element 316 and the motor arrangement 318, 322, the excessive torque is inputted into the transmission means 332 via the driven element 316. The transmission means 332 and the input element 326 are interconnected by means of the threaded sleeve 338 in the manner disclosed in relation to the first embodiment, such that a torque also acts on the threaded sleeve 338 during torque conversion. In the event of overload, the torque on the threaded sleeve 338 is large enough to cause the toothings 355, 356 to slide along on one another and to displace the coupling wheel 358 in an axial direction counter to the force of the spring 364. Releasing the toothing engagement between the coupling wheel 358 and the threaded sleeve 338 makes it possible for the threaded sleeve 338 to rotate relative to the housing 312 in accordance with the rotation of the transmission means 332 and thus independently of a rotation of the input element 326. The torque transmission between the driven element 316 and the motor arrangement 318, 322 is thus eliminated at this point, and introduction of an excessive torque into the motor arrangement 318, 322 can be prevented. When the overload state no longer applies, the spring 364 moves the coupling wheel 358 back into toothed engagement with the threaded sleeve 338, such that said sleeve is held rotationally engaged in the housing again and normal operation is possible again.

In the following, a fifth embodiment of the present invention is disclosed with reference to FIGS. 7 and 8. The fifth embodiment is a modification to the fourth embodiment, and so only the differences from the fourth embodiment are discussed in detail in the following, and as regards the construction and operation of all other components, reference is hereby expressly made to the above description of the fourth embodiment, where applicable in connection with the descriptions of the third and first embodiments.

In the fifth embodiment, the overload coupling 450 is substantially of an identical construction to in the third embodiment, but with a difference in the shape of the toothings 455 and 456 of the coupling wheel 458 and of the threaded sleeve 438. As can clearly be seen in FIGS. 7 and 8, the coupling wheel merely comprises three projections or teeth 456-1, 456-2 and 456-3, which are arranged mutually offset by an angle of 120°. In a corresponding manner, three notches 455-1, 455-2 and 455-3 are arranged mutually offset by an angle of 120° on the end face of the threaded sleeve 438. The coupling wheel 458 and threaded sleeve 438 can thus only be brought into engagement in three different rotational positions.

The adjustment arrangement 400 of the fifth embodiment achieves a particular effect in an application in which the driven element 416 has a normal operating angle of less than 120°. A frequently occurring application is, for example, a valve actuation arrangement in which a valve fastened to the driven element 416 is to be pivoted by a pivot angle between the open position and the closed position which is less than 120°, for example approximately 90°. In an application of this type, the overload coupling 450 has the following effect. If, during the movement of the driven element 416 within the operating angle, the driven element 416 is blocked or there is some other excessive stress on the driven element 416, the torque transmission is disconnected in the region of the overload coupling 450 and thus rotation of the input element 426 is converted into a rotation of the threaded sleeve 438 via the linear displacement of the transmission means 432. The angle of rotation of the threaded sleeve 438 thus corresponds to the angle of rotation through which the driven element 416 would rotate if it were not blocked. In an application where the operating angle of the driven element 416 is less than 120°, and thus where the motor arrangement may also be set up in both directions only to rotate until this operating angle is covered, the rotation of the motor and thus the rotation of the threaded sleeve 438 ends before the toothing 456 of the coupling wheel 458 has latched into a following toothing 455 of the threaded sleeve 438. This means that in a case of interference of this type, after the motor is switched off, the driven element 416 can for example be manually repositioned until it reaches the end point of the normal operating angle, and subsequently each tooth of the coupling wheel 458 moves back into precisely the same associated notch of the threaded sleeve 438 with which the tooth would also have engaged during normal operation of the adjustment arrangement 400 until the overload occurred. This necessarily means that the overload means, in particular, is located very precisely with respect to the longitudinal axis in the position where it would be if the overload had not occurred and if the adjustment arrangement 400 had instead travelled to the relevant end position in normal operation. In this way, it can be ensured that the adjustment arrangement 400 can be returned to a position ready for operation in a simple manner after an overload is eliminated.

The aforementioned effect of the fifth embodiment can of course also be achieved if the coupling wheel 458 comprises three corresponding notches or depressions instead of the teeth 456-1, 456-2, 456-3, and the matching teeth would instead be provided on the threaded sleeve 438. Further, instead of three teeth and three depressions on the coupling wheel 458 and threaded sleeve 438, more teeth and more depressions or only two teeth and two depressions or even only one tooth and one associated depression could be provided. What is important for the aforementioned effect is that an intermediate angle between adjacent latching positions (latching rotational positions) of the coupling wheel 458 and the threaded sleeve 438 is greater than an operating angle of the driven element 416, for example a maximum pivot angle of a valve in the case of a valve control device.

Finally, it should be noted that in the fifth embodiment the threaded sleeve 438 may be formed in two pieces, and specifically may comprise a first portion 438-1 which carries the toothing 455 and comprise a second portion 438-2, the first portion 438-1 and the second portion 438-2 being rigidly interconnected. Alternatively, the threaded sleeve 438 could be formed in a single piece, as in the third embodiment.

The invention claimed is:

1. Adjustment arrangement, comprising
    a) a rotating input element at which a first torque from a motor arrangement can be inputted into the adjustment arrangement,
    b) a rotating output element at which a second torque can be outputted by the adjustment arrangement,
    c) a transmission portion for converting the first torque into the second torque,
    wherein the transmission portion comprises a transmission means having a first threaded portion and a second threaded portion, and
    d) a housing receiving therein the input element, the motor arrangement, and the transmission means,
    wherein the first threaded portion converts a rotation of the input element into an axial movement of the transmission means, and the second threaded portion converts an axial movement of the transmission means into a rotation of the output element,
    wherein the first threaded portion and the second threaded portion have different thread pitches from one another,
    wherein the transmission means is operably connected to the output element (1) in an axially displaceable manner so that axial movement of the transmission means is not transferred into axial movement of the output element and (2) in a rotationally engaged manner so that rotational movement of transmission means is transferred into rotational movement of the output element, wherein the first threaded portion is in threaded engagement with an external thread formed along an axial length of the input element, wherein the second threaded portion is in threaded engagement with a threaded element which is rotationally and axially fixed to the housing of the adjustment arrangement during normal operation.

2. Adjustment arrangement according to claim 1, wherein the transmission means comprises a spindle nut and in that the first threaded portion and the second threaded portion are formed on different portions of the spindle nut.

3. Adjustment arrangement according to claim 1, wherein the adjustment arrangement has a primary axis about which the input element and the output element rotate and along which the transmission means is axially displaceable.

4. Adjustment arrangement according to claim 1, wherein the input element is rotatably driven by the motor arrangement.

5. Adjustment arrangement according to claim 4, wherein the motor arrangement comprises a motor and a transmission, preferably a planetary transmission, an output torque of the motor being inputted into the transmission and an output torque of the transmission driving the input element.

6. Adjustment arrangement according to claim 1, wherein an overload control means, which is set up to interrupt a rotational coupling between the output element and the motor arrangement, or at least to reduce it over a particular angle-of-rotation range, in the event of an overload, in which a torque exceeding a predetermined overload torque for the adjustment arrangement is inputted at the output element.

7. Adjustment arrangement according to claim 1, wherein the overload control means is arranged in a torque-transmitting manner between the input element and the motor arrangement.

8. Adjustment arrangement according to claim 6, wherein the overload control means is arranged between the output element and the input element.

9. Adjustment arrangement according to claim 6, wherein the second threaded portion is engaged with a threaded element, the threaded element being held in a rotationally engaged manner with respect to the housing of the adjustment arrangement by the overload control means during normal operation, i.e. when a torque between the output element and the motor arrangement is less than a predetermined overload torque, and the threaded element being released for rotation relative to the housing by the overload control means in the event of overload, i.e. when the torque between the output element and the motor arrangement is greater than or equal to the predetermined overload torque.

10. Adjustment arrangement according to claim 6, wherein the overload control means comprises an axially movable coupling element, which is shifted in an axial direction counter to a restoring force, so as to interrupt torque transmission via the coupling element, in the event of overload, i.e. when a torque between the output element and the motor arrangement is greater than or equal to the predetermined overload torque.

11. Adjustment arrangement according to claim 2, wherein one of the two threaded portions forming an internal thread of the spindle nut and the other threaded portion forming an external thread of the spindle nut.

12. Adjustment arrangement according to claim 1, wherein movement of the output element does not include the axial movement.

13. Adjustment arrangement, comprising
a) a rotating input element at which a first torque from a motor arrangement can be inputted into the adjustment arrangement,
b) a rotating output element at which a second torque can be outputted by the adjustment arrangement, and
c) a transmission portion for converting the first torque into the second torque,
wherein the transmission portion comprises a transmission member having a first threaded portion and a second threaded portion,
wherein the first threaded portion converts a rotation of the input element into an axial movement of the transmission member, and the second threaded portion converts an axial movement of the transmission member into a rotation of the output element,
wherein the first threaded portion and the second threaded portion have different thread pitches from one another,
wherein the transmission member is rotatably connected to the output element for transmitting torque and is axially displaceable into and out of the output member for allowing relative axial movement between the transmission member and the output element,
wherein the adjustment arrangement includes a housing in which the input element, the motor arrangement, and the transmission member are accommodated,
wherein the second threaded portion is in threaded engagement with a threaded element which is rotationally and axially fixed to the housing during normal operation.

* * * * *